United States Patent Office 2,733,824
Patented Feb. 7, 1956

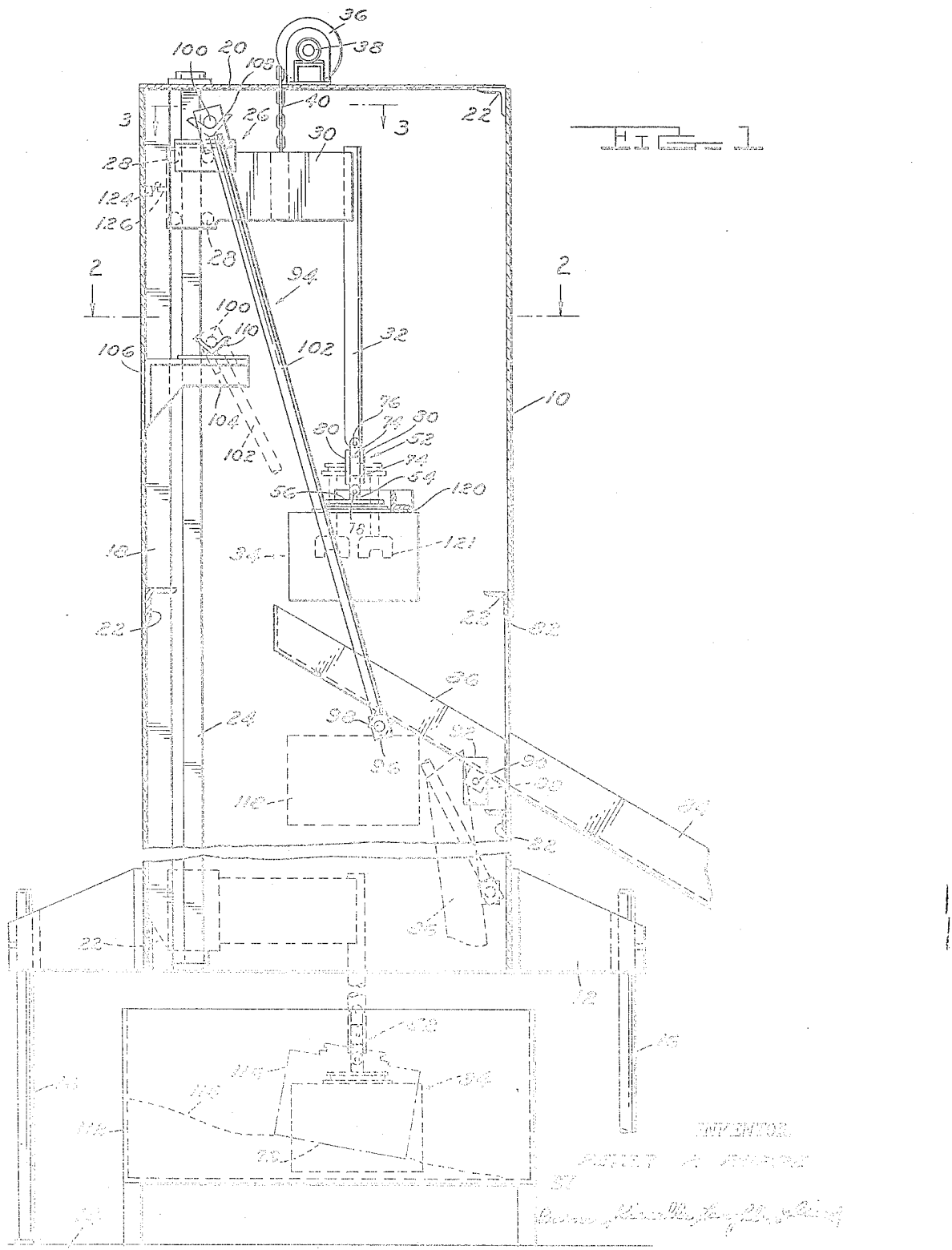

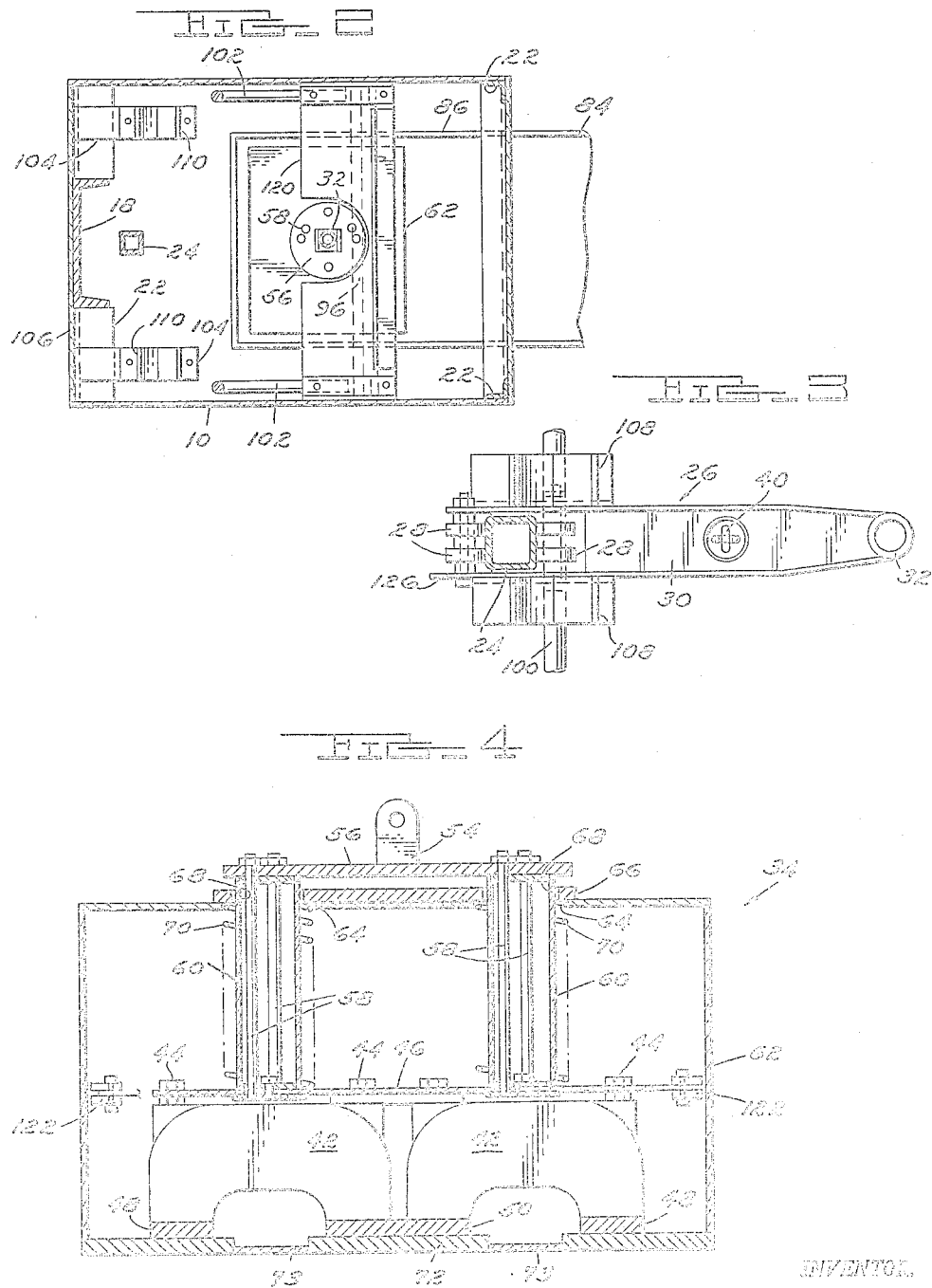

2,733,824

MAGNETIC ELEVATING CONVEYOR

Peter P. Ruppe, St. Clair Shores, Mich.

Application June 1, 1954, Serial No. 433,689

7 Claims. (Cl. 214—623)

This invention relates to a conveyor for magnetic articles and particularly a conveyor using a permanent magnet unit for carrying the articles to a release point generally vertically above the pickup point.

In such a conveyor there is a stripper plate contiguous to the magnet and articles being conveyed are in physical contact with the stripper plate rather than the magnet itself. The articles are released by moving the stripper away from the magnet, thereby removing the articles from the magnetic field. Such a conveyor is disclosed in copending application Serial No. 273,290, filed February 25, 1952.

An exemplary application of this type conveyor lies in elevating magnetic parts such as nuts and bolts from a container at the base of the conveyor to a hooper or feeder for machines or the like. To prevent parts stripped from the magnet from falling back down to their original container, prior devices have been arranged to swing the magnet laterally at the top of its path to a release point at the side of the conveyor. This is wasteful of space, requires relatively complicated linkage, and the swinging magnet tends to sling the parts off, thereby endangering nearby personnel.

An object of this invention is to provide a simple, inexpensive structure facilitating release of conveyed articles at a point substantially vertically above the pickup point. The invention is carried out generally by providing a chute which shifts into position below the magnet during its ascent and which returns to a retracted position to permit descent of the magnet after release of the parts conveyed.

A further object of the invention is to provide means permitting the magnet unit to adjust to the slope of the surface of the body of articles to be conveyed to insure a capacity pickup for each cycle of the conveyor. This is accomplished generally by providing a flexible connection between the magnet and its carrier.

One form of the invention is shown in the accompanying drawings which may be briefly described as follows:

Fig. 1 is a partly diagrammatic view of the device of this invention with some parts shown in section and others shown in elevation.

Fig. 2 is a view on line 2—2 of Fig. 1.

Fig. 3 is a view on line 3—3 of Fig. 1.

Fig. 4 is a detailed sectional view of the magnet pod.

The device shown in Fig. 1 has a body 10 with a base 12 supported above a floor or other supporting surface 14 by legs 16 which may be threadedly connected to the base for leveling purposes. A member 18 extends vertically along the interior of one side of the body 10 from the base to the top 20 of the body as shown. This member may be in the form of a channel (Fig. 2) and serves as a support or backbone for the body structure. The body may also have other reinforcing members as shown at 22.

A vertical track 24, preferably in the form of a rectangular tube (Fig. 2), extends from the base to the top of the body as shown in Fig. 1 and a carrier 26 travels thereon. Carrier 26 has stabilizing rollers 28 which engage the sides of track 24 and has a boom or arm 30 extending laterally of the track. Depending from the arm at a generally central location in body 10 is an element 32 which supports a magnet pod 34. Carrier 26 is raised and lowered within body 10 by such means as a hoist 36 mounted on the body, driven by an electric motor 38 and having a chain 40 secured by suitable means on arm 30.

The magnet pod (Fig. 4) has a number of permanent horseshoe-type magnets 42 secured by such means as bolts 44 to a support plate 46 and pole strips 48 and 50 are secured by suitable means to like poles of the magnets. The magnet assembly is supported by element 32 on the carrier 26 through a universal joint 52 secured to a bar 54 on a plate 56 fastened to the magnet support plate 46 by elongate bolts 58 (Fig. 4). Cylinders 60 surround bolts 58 and are secured between plates 46 and 56 thereby.

The magnet assembly is enclosed within a housing 62 preferably of non-magnetic material having openings 64 through which cylinders 60 project and having a plate 66 secured to its top, plate 66 also having openings 68 to accommodate cylinders 60. Openings 68 have smaller diameter than openings 64 in the housing so that plate 66 provides a seat for coil springs 70 compressed against magnet plate 46. The magnet assembly and its housing are thus shiftable relatively to each other with the springs ordinarily holding pole strips 48 and 50 firmly against bottom 72 of the housing. Bottom 72 includes non-magnetic portions 73 positioned between the poles of the magnets.

The universal joint 52 preferably comprises clevis links 74 pivoted on parallel axes to support element 32 on the carrier and to bar 54 on the magnet pod as shown at 76 and 78. Bar links 80 are pivoted on clevis links 74 on axes which are generally parallel to each other and normal to pivots 76 and 78.

The body 10 has an opening 82 providing an outlet for conveyed parts and adjacent which a chute 84 may be positioned. A chute 86 is mounted to swing vertically within the body 10 and for this purpose has brackets 88 near one end supported by a pivot 90 journaled in brackets 92 secured on the body 10 near the opening 82. A parallel frame 94 connects chute 86 with carrier 26 so that upon ascent of the carrier the chute will be elevated to operative position as shown in solid lines (Fig. 1) and so that upon descent of the carrier the chute will be lowered to inoperative position as shown in broken lines (Fig. 1). The parallel frame 94 comprises a pintle member 98 journaled in brackets 96 generally centrally located on chute 86, a member 100 for engaging the carrier and two interconnecting rods 102 which straddle the chute.

The member 100 lies forwardly of track 24 and in the path of carrier arm 30. Brackets 104 extend forwardly of the rear wall 106 of body 10 on opposite sides of track 24 for stopping the descent of member 100 when chute 86 reaches its retracted position. Preferably angles 108 are mounted on top of the carrier for picking up and carrying member 100 during ascent and angles 110 are secured on stops 104 for receiving member 100 during its descent.

In use, a bin or container 112 containing parts to be conveyed is placed beneath the base of the conveyor in the position generally shown in Fig. 1. Hoist 36 is actuated to lower carrier 26 so that the bottom 72 of the magnet pod 34 is brought into contact with the surface 114 of the body of parts in container 112. At this time the carrier and magnet pod are in the position shown generally in dotted lines at 116 of Fig. 1. The universal joint 52 permits the bottom 72 of the magnet pod to adjust to the slope of surface 114 as shown. Pole strips 48 and 50 are held firmly against bottom 72 of the magnet pod by springs 70 as shown in Fig. 4. This structure facilitates properly positioning the magnets to pick up a capacity number of parts in bin 112 regardless of the slope of surface 114.

The hoist is then actuated to raise carrier 26, magnet pod 34 and the parts magnetically engaged by magnets 42. Chute 86 is in retracted position and elevating rods 102 lie adjacent the sides of body 10 so that they do not interfere with the carrier or pod in their ascent. When the ascending pod has reached an intermediate position generally adjacent the retracted chute as indicated by dotted lines 118, angles 108 on the top of the carrier engage member 100 and carry it upwardly which, through rods 102, elevates chute 86 toward its operative position.

When the pod reaches the position shown in solid lines in Fig. 1, its ascent is stopped by a limit plate 120 secured across the interior of body 10. However, the carrier continues upwardly carrying the magnet assembly to the dotted line position 121 (Fig. 1) and compressing springs 70. As the magnets move away from the bottom 72 of the pod they also move away from the conveyed parts in contact with bottom 72 and the magnetic field in the conveyed parts is weakened to the point where they fall free of the magnet pod. In this stripping action laterally extending bumpers 122 (Fig. 4) on the magnet support plate 46 prevent excessive relative lateral movement between the magnet assembly and housing 62. In the meantime the continued ascent of the carrier has pivoted chute 86 into proper position for catching the released parts which slide down chute 86, through opening 82 in body 10 and into exterior chute 84 to a desired ultimate location such as a hopper or feeder for a machine.

A switch 124 may be mounted on body 110 to be operated by a striker 126 on carrier 26 for limiting the upward movement of the carrier or reversing its direction at the top of its stroke. After the parts have been stripped from the magnets and discharged through opening 82, hoist 36 is actuated to lower carrier 26. In the initial descent housing 62 is held stationary against limit plate 120 by springs 70 until pole strips 48 and 50 on the magnets engage bottom 72 of the housing. The entire magnet pod then descends as a unit. Element 100 descends gravitationally with the carrier permitting chute 86 to swing downwardly and when the chute has reached its retracted position element 100 comes to rest in angles 110 on stops 104, preventing further movement of the chute and its associated parts. The chute has thus swung out of the path of the descending magnet pod and carrier as illustrated. The carrier continues its descent until the magnet pod again contacts surface 114. The hoist may then be reversed and the cycle repeated.

The device as described may be operated manually or may be provided with suitable controls for automatic operation. Such controls are within the knowledge of those versed in the art and are not shown.

I claim:

1. A conveyor of the type having a permanent magnet unit for carrying magnetic articles with a stripper contiguous to the magnet and movable away from the magnet to release such articles from the field of the magnet, said conveyor comprising, a body having receiving means for articles to be conveyed, means on said body forming a movable carrier for said magnet unit, means associated with said body and carrier selectively operable to move said carrier to a point adjacent said receiving means to permit said magnet to engage such articles and to a release point, means on said body engaging said stripper to release articles adjacent said release point, a chute mounted on said body through a pivot at a location intermediate said points and having a portion shiftable to on operative position in the path of said magnet unit and generally subjacent said release point and to a retracted position outside of such path, a parallel frame having one member pivoted on said chute at a location spaced from the first mentioned pivot, having two members adjacent said one member straddling the path of said magnet unit and having a fourth member on said two members, and a lost motion connection between said fourth member and said carrier operable to shift said portion of said chute to said operative position and retracted position, respectively, when said magnet unit, moving between the first mentioned pivot and said release point, approaches and recedes from said release point.

2. A conveyor of the type having a permanent magnet unit for carrying magnetic articles with a stripper contiguous to the magnet and movable away from the magnet to release such articles from the field of the magnet, said conveyor comprising, a body with a base adapted to receive a container of articles to be conveyed, means on said body forming a movable carrier for carrying said magnet unit in a substantially vertical path between a pickup point adjacent such container and a release point above said pickup point, means associated with said body and carrier selectively operable to move said carrier to said points, means on said body engaging said stripper to release conveyed articles at said release point, a chute mounted on said body through a pivot at a location intermediate said points for swinging in a vertical direction, said chute having a portion shiftable to an elevated operative position in the path of said magnet unit and subjacent said release point and to a lowered retracted position outside of such path, an element secured to said chute through a pivot spaced from the first mentioned pivot, said element having a portion positioned to be engaged and carried upwardly by said carrier during ascent of said magnet unit above said chute in its retracted position, whereby to elevate said chute to operative position when said magnet unit approaches said release point, said element and chute pivoting freely to descend with said carrier to retracted position of said chute, and means on said body engaging said element to stop the descent of said element at said retracted position.

3. A conveyor of the type having a permanent magnet unit for carrying magnetic articles with a stripper contiguous to the magnet and movable away from the magnet to release such articles from the field of the magnet, said conveyor comprising, a body with a base adapted to receive a container of articles to be conveyed, means on said body forming a movable carrier for carrying said magnet unit in a substantially vertical rectilinear path between a pickup point adjacent such container and a release point above said pickup point, means associated with said body and carrier selectively operable to move said carrier to said points, means on said body engaging said stripper to release conveyed articles at said release point, a chute mounted on said body through a pivot at a location intermediate said points for swinging in a vertical direction, said chute having a portion shiftable to an elevated operative position in the path of said magnet unit and subjacent said release point and to a lowered retracted position outside of such path, a parallel frame having one member pivoted on said chute at a location spaced from the first mentioned pivot, having two members adjacent said one member straddling the path of said magnet unit and having a fourth member on said two members, said fourth member being positioned to be engaged and carried upwardly by said carrier during ascent of said magnet unit above said chute in its retracted position, whereby to elevate said chute to operative position when said magnet unit approaches said release point, said one member and chute pivoting freely to descend with said carrier to retracted position on said chute, and means on said body engaging said fourth member to stop the descent thereof at said retracted position.

4. A conveyor of the type having a permanent magnet unit for carrying magnetic articles with a stripper contiguous to the magnet and movable away from the magnet to release such articles from the field of the magnet, said conveyor comprising, a body having receiving means for articles to be conveyed, a carrier for said magnet unit movable by means associated with said body and carrier selectively to a point adjacent said receiving means and to a release point, means on said body actuating said stripper adjacent said release point, a universal joint connecting a portion of said carrier and a portion of said magnet unit to permit said magnet unit to adjust to the slope of the surface of articles to be conveyed, said joint including one element pivoted on one of said portions for swivelling in one plane and another element on the other of said portions pivoted on said one element for swivelling in a plane substantially normal to said one plane, means forming a chute mounted on said body with a portion shiftable to an operative position adjacent said release point and to a retracted position lying outside of the path of said magnet unit, and means on said chute and carrier operable to shift said chute to said operative position and said other position, respectively, when said magnet unit approaches and recedes from said release point.

5. A conveyor of the type having a permanent magnet unit for carrying magnetic articles with a stripper contiguous to the magnet and movable away from the magnet to release such articles from the field of the magnet, said conveyor comprising, a body having receiving means for articles to be conveyed, a carrier for said magnet unit movable by means associated with said body and carrier selectively to a point adjacent said receiving means and to a release point, means on said body actuating said stripper adjacent said release point, a universal joint connecting said carrier and magnet unit to permit said magnet unit to adjust to the slope of the surface of articles to be conveyed, said joint including clevises pivoted on said carrier and said magnet unit for swivelling in substantially one plane, and link means pivoted on each of said clevises for swivelling in a plane substantially normal to said one plane, means forming a chute mounted on said body with a portion shiftable to an operative position adjacent said release point and to a retracted position lying outside of the path of said magnet unit, and means on said chute and carrier operable to shift said chute to said operative position and said retracted position, respectively, when said magnet unit approaches and recedes from said release point.

6. A conveyor for magnetic articles comprising, a body having receiving means for articles to be conveyed, means forming a generally rigid track on said body, a carrier on said track, said carrier being movable on said track in a generally rigidly defined path between a point adjacent said receiving means and a release point, means selectively operable to move said carrier to said points, a permanent magnet unit adapted to magnetically engage the articles to be conveyed, means forming a stripper contiguous to the magnet unit and movable away from the magnet unit to release such articles from the field thereof, flexible means interconnecting said magnet unit and said carrier in closely adjacent relation, so that said magnet unit moves generally in said defined path with said carrier and so that said magnet unit can adjust to random slopes of articles in said receiving means and pick up a capacity load of such articles, and means on said body and magnet unit operable to actuate stripper adjacent said release point for releasing articles carried by said magnet unit.

7. A conveyor for magnetic articles comprising, a body having receiving means for articles to be conveyed, means forming a generally rigid track on said body, a carrier on said track, said carrier being movable on said track in a generally rigidly defined path between a point adjacent said receiving means and a release point, means selectively operable to move said carrier to said points, a permanent magnet unit adapted to magnetically engage the articles to be conveyed, a stripper contiguous to the magnet unit and movable away from the magnet unit to release such articles from the field thereof, said stripper having generally flat solid plate form lying generally in a plane parallel to the poles of said magnet unit, a universal joint interconnecting said carrier and magnet unit in closely adjacent relation, so that said magnet unit moves generally in said defined path with said carrier and so that said magnet unit can adjust to random slopes of articles in said receiving means and pick up a capacity load of such articles, and means on said body and magnet unit operable to actuate said stripper adjacent said release point for releasing articles carried by said magnet unit.

References Cited in the file of this patent

UNITED STATES PATENTS

| | | |
|---|---|---|
| 83,672 | Bock | Feb. 28, 1905 |
| 977,046 | Schnabel | Nov. 29, 1910 |
| 1,138,322 | Santrock | May 4, 1915 |
| 1,556,161 | Ripberger | Oct. 6, 1925 |
| 2,405,655 | Kehoe | Aug. 13, 1946 |
| 2,615,746 | Fischer | Oct. 28, 1952 |